United States Patent
Dougherty

(10) Patent No.: US 8,824,095 B1
(45) Date of Patent: Sep. 2, 2014

(54) SPINDLE MOTOR HAVING AN INCREASED MAGNET DIAMETER ABOVE HEAD PLANE

(71) Applicant: Western Digital Technologies, Inc., Irvine, CA (US)

(72) Inventor: Mitchell D. Dougherty, Los Gatos, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 66 days.

(21) Appl. No.: 13/625,692

(22) Filed: Sep. 24, 2012

(51) Int. Cl.
*G11B 17/02* (2006.01)

(52) U.S. Cl.
USPC .................................................. 360/99.08

(58) Field of Classification Search
USPC .................................................. 360/99.08
See application file for complete search history.

(56) References Cited

U.S. PATENT DOCUMENTS

| | | |
|---|---|---|
| 5,031,061 A | 7/1991 | Hatch |
| 5,592,349 A | 1/1997 | Morehouse et al. |
| 5,982,581 A | 11/1999 | Kazmierczak et al. |
| 6,208,486 B1 | 3/2001 | Gustafson et al. |
| 6,417,991 B1 | 7/2002 | Onda |
| 6,563,668 B1 | 5/2003 | Suwito |
| 6,636,380 B2 | 10/2003 | Goeke et al. |
| 6,754,042 B1 | 6/2004 | Chiou et al. |
| 6,888,698 B1 | 5/2005 | Berding et al. |
| 7,327,531 B2 * | 2/2008 | Elsing ........................ 360/98.07 |
| 7,371,041 B2 | 5/2008 | Pfeiffer et al. |
| 7,529,064 B1 * | 5/2009 | Huang et al. ............... 360/99.08 |
| 7,826,173 B2 | 11/2010 | Lee |
| 8,077,432 B2 | 12/2011 | Hanlon et al. |
| 8,416,522 B1 | 4/2013 | Schott et al. |
| 2005/0185329 A1 | 8/2005 | Miyajima et al. |
| 2005/0185330 A1 | 8/2005 | Lee et al. |
| 2009/0196540 A1 * | 8/2009 | Maruyama et al. ........... 384/100 |

* cited by examiner

*Primary Examiner* — Mark Blouin

(57) ABSTRACT

A spindle motor for a disk drive including a hub defining a longitudinal axis having a hub flange defining a mounting surface extending substantially normal to the longitudinal axis, wherein the hub flange of the hub extends longitudinally relative to the mounting surface to define a vertical surface; and a motor base coupled to the hub proximate to the hub flange of the hub, the motor base having a central axis substantially aligned with the longitudinal axis, wherein the motor base extends longitudinally, wherein a radius of the motor base is greater than a radius of the hub flange of the hub.

13 Claims, 10 Drawing Sheets

SPINDLE MOTOR HAVING AN INCREASED MAGNET DIAMETER ABOVE HEAD PLANE

FIELD

The present disclosure relates generally to information storage devices and in particular to a disk drive having spindle motor having a motor base and the hub having a diameter less than the motor base.

BACKGROUND

Disk drives typically include a spindle motor for rotating one or more disks in order to read data from and write data to surfaces of the disks. The spindle motor, an example of which is shown in FIG. 1A, incldues motor base 1005 made up of a stator having a plurality stator teeth 310, which are wrapped with wire to form a plurality of coils 315, and a rotor having one or more rotor magnets 320 and a rotating hub 1000 coupled to the motor base on which the disks may be mounted and clamped. Different coils 315 of the stator are alternately energized to form a changing electromagnetic field that pulls/pushes the rotor magnets, thereby rotating the hub. Rotation of the hub, in turn, results in rotation of the disks mounted thereto.

In one type of current spindle motor designs, the motor base 1005, which includes the magnet 320 and back iron 325, is vertically spaced separated from the plane that the heads operate in. A hub 1000 is provided that supports the disk with the motor base 1005 being positioned below the hub 1000. The outer diameter of the motor base 1005 is sized to have the same outer diameter as of the hub 1000 having a disk mounting surface 1030 for supporting a disk (not shown).

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit the scope of the disclosure. Throughout the drawings, reference numbers are reused to indicate correspondence between referenced elements.

DETAILED DESCRIPTION

Figure 1A:
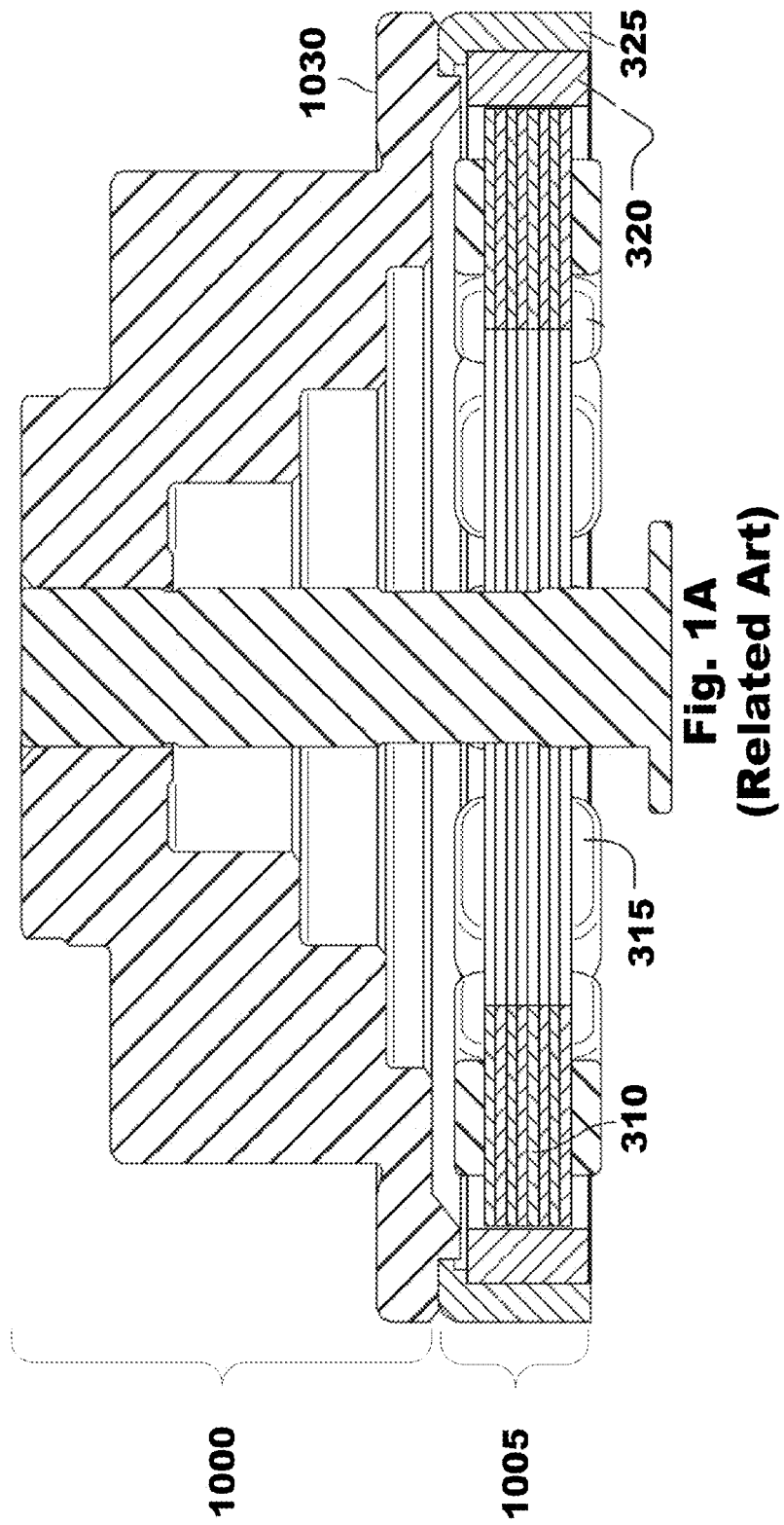
FIG. 1A is a section view of a related hub and motor base.
Figure 1B:
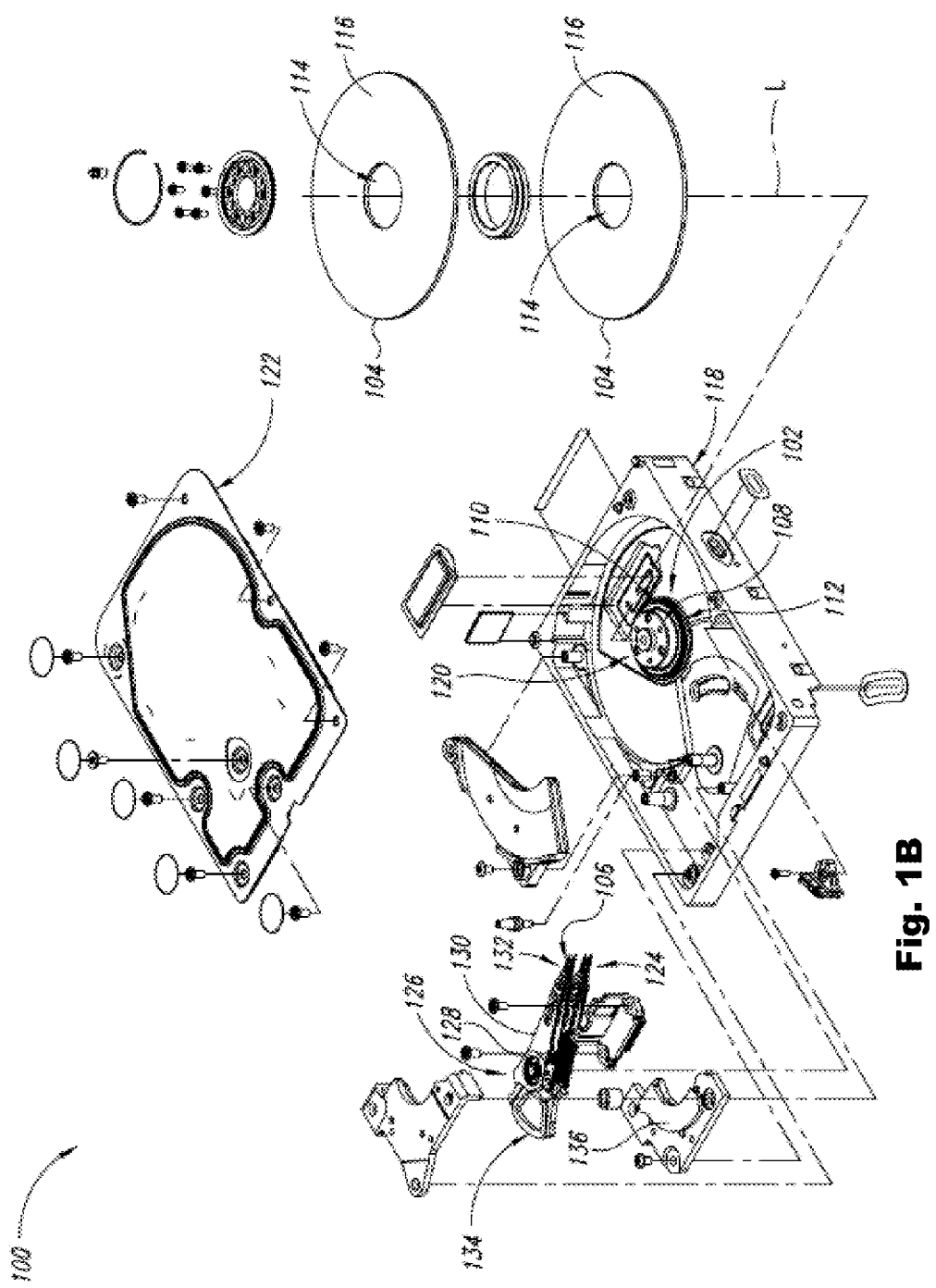
FIG. 1B is an exploded, perspective view generally illustrating a disk drive including an exemplary motor hub, according to an embodiment.
Figure 4:
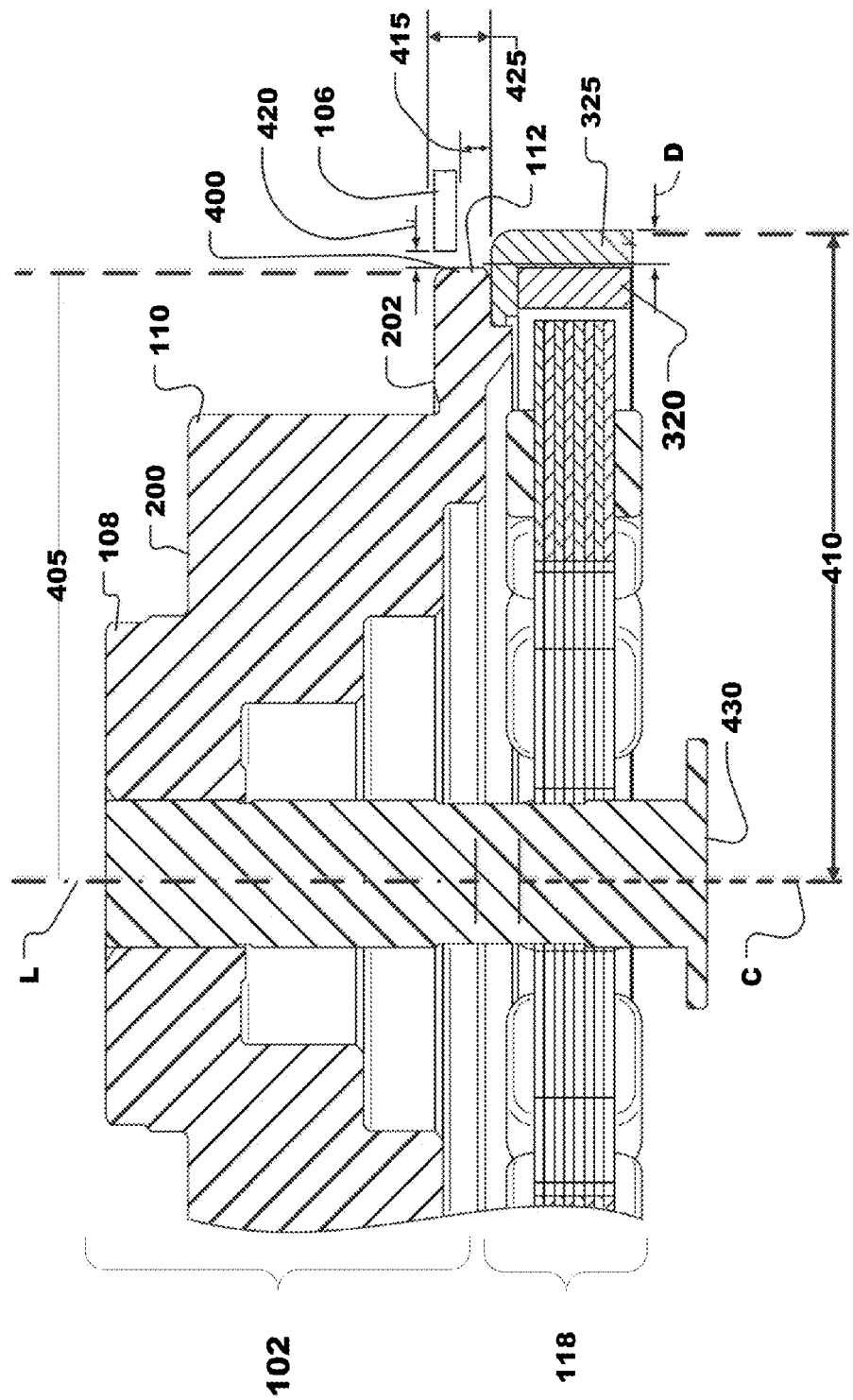
FIG. 4 is a partial section view of the hub and motor base of FIG. 1B, according to one example embodiment.

Referring to FIGS. 1B and 4, a disk drive 100 is illustrated, according to one embodiment. The disk drive 100 comprises a hub 102, a disk 104 physically contacting and supported by at least one mounting surface of the hub 102, and at least one head 106 operable to write to and read from the disk 104. In one embodiment, the hub 102 defines a longitudinal axis L and comprises an upper cylindrical portion 108, and a middle cylindrical portion 110 proximate to the upper cylindrical portion 108, the middle cylindrical portion 110 defining an upper surface substantially normal to the longitudinal axis L, the upper surface extending radially beyond the upper cylindrical portion 108. The hub 102 may further comprise a hub flange 112 proximate the middle cylindrical portion 110, the hub flange 112 defining a mounting surface substantially normal to the longitudinal axis L, the mounting surface extending radially beyond the middle cylindrical portion 110.

As illustrated herein, the disk drive 100 comprises a magnetic disk drive, and the structures and methods described herein will be described in terms of such a disk drive. However, these structures and methods may also be applied to and/or implemented in other disk drives, including, e.g., optical and magneto-optical disk drives.

The disks 104 may comprise any of a variety of magnetic or optical disk media having a substantially concentric opening 114 defined there through. Of course, in other embodiments, the disk drive 100 may include more or fewer disks. For example, the disk drive 100 may include one disk or it may include two or more disks. The disks 104 each include a disk surface 116, as well as an opposing disk surface not visible in FIG. 1B. In one embodiment, the disk surfaces 116 comprise a plurality of generally concentric tracks for storing data.

As illustrated, the hub 102 may be coupled to and support the disks 104. The hub 102 is rotatably attached to a motor base 118 of the disk drive 100, and may form one component of a motor 120 (e.g., a spindle motor). The motor 120 and the hub 102 may be configured to rotate the disks 104 about the longitudinal axis L. As discussed in greater detail below, the hub 102 may comprise vertical and horizontal surfaces that form mounting surfaces or spaces between various components.

The disk drive 100 may further include a cover 122, which, together with the motor base 118, may house the disks 104 and the motor 120. The disk drive 100 may also include a head stack assembly ("HSA") 124 rotatably attached to the motor base 118. The HSA 124 may include an actuator 126 comprising an actuator body 128 and one or more actuator arms 130 extending from the actuator body 128. The actuator body 128 may further be configured to rotate about an actuator pivot axis.

One or two head gimbal assemblies ("HGA") 132 may be attached to a distal end of each actuator arm 130. Each HGA 132 includes a head 106 operable to write to and read from a corresponding disk 104. The HSA 124 may further include a coil 134 through which a changing electrical current is passed during operation. The coil 134 interacts with one or more magnets 136 that are attached to the motor base 118 to form a voice coil motor ("VCM") for controllably rotating the HSA 124.

The head 106 may comprise any of a variety of heads for writing to and reading from a disk 104. In magnetic recording applications, a head 106 may include an air bearing slider and a magnetic transducer that includes a writer and a read element. The magnetic transducer's writer may be of a longitudinal or perpendicular design, and the read element of the magnetic transducer may be inductive or magnetoresistive. In optical and magneto-optical recording applications, the head may include a mirror and an objective lens for focusing laser light on to an adjacent disk surface.

The disk drive 100 may further include a printed circuit board ("PCB") (not shown). The PCB may include, inter alia, a disk drive controller for controlling read and write operations and a servo control system for generating servo control signals to position the actuator arms 130 relative to the disks 104.

Figure 2:
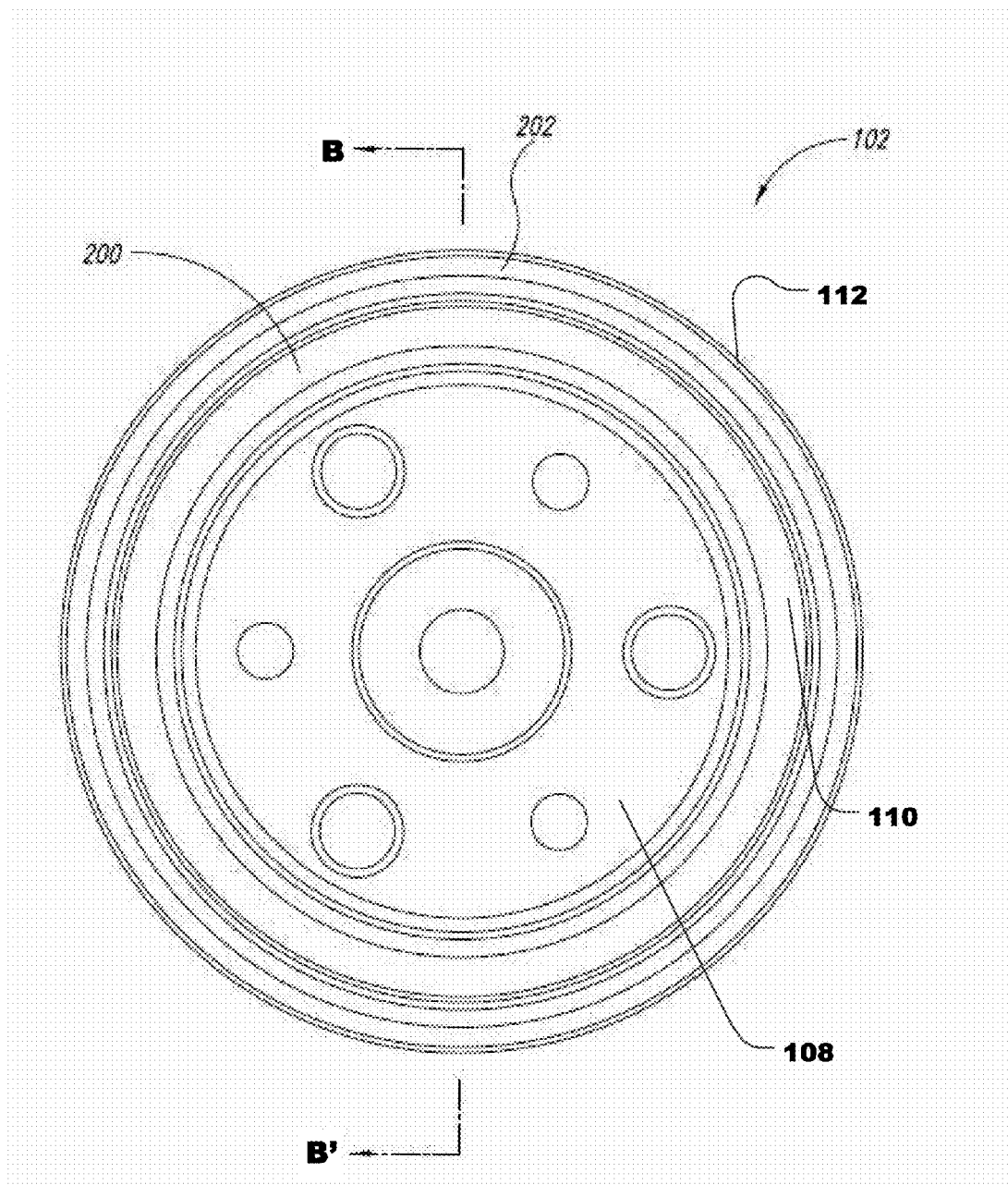
FIG. 2 is a top view illustrating a hub of FIG. 1B, according to an example embodiment.
Figure 3:
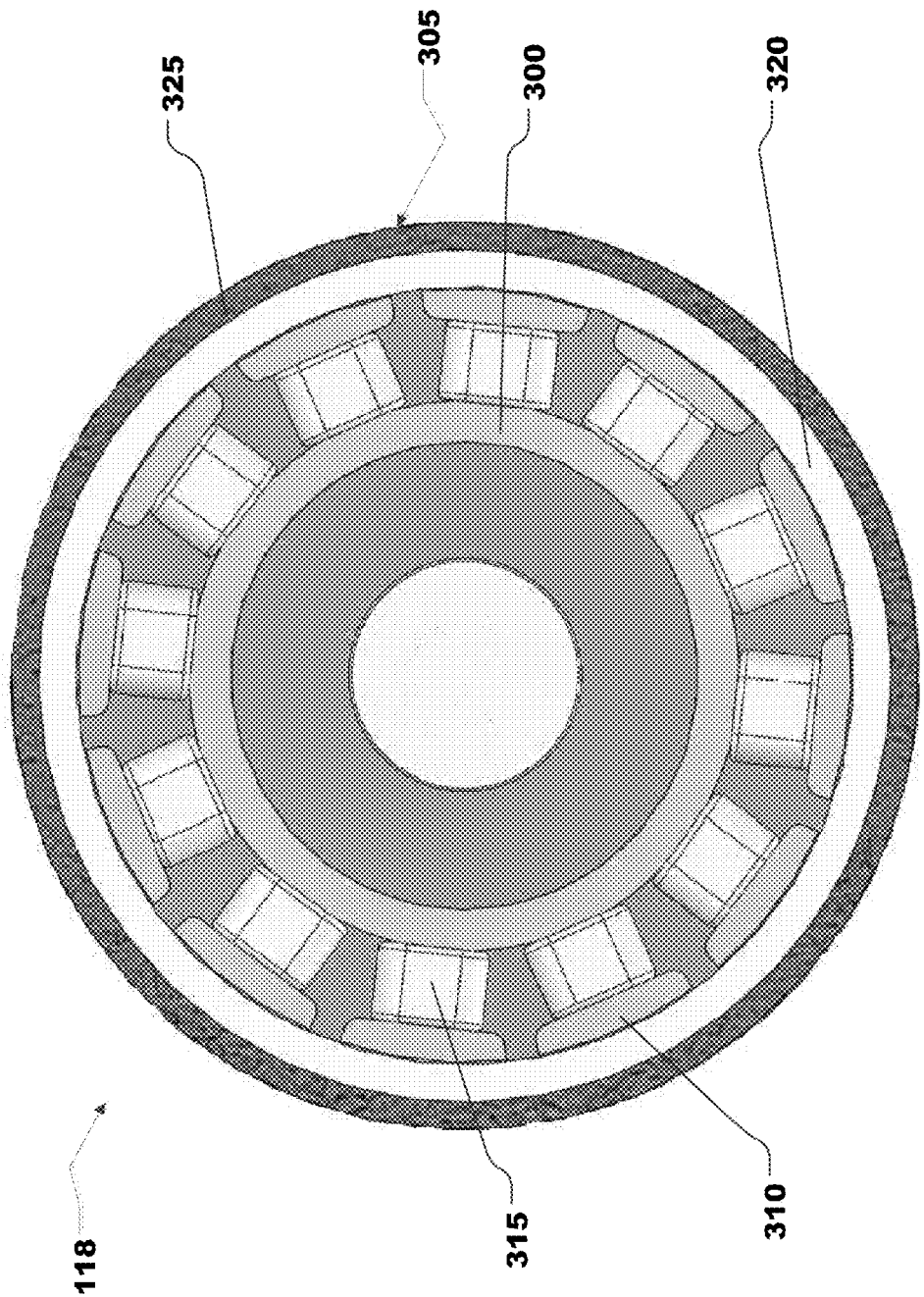
FIG. 3 is a bottom view illustrating the motor base of FIG. 1B, according to an example embodiment.

FIGS. 2-7 show a number of views of the exemplary hub 102 and the motor base 118, which may together form the spindle motor 120, and are shown separated from the disk drive 100. FIG. 2 shows a top view of the hub 102. FIG. 3 shows a bottom view of the motor base 118. FIGS. 4-7 show partial section views of the hub 102 and motor base 118 according to different example embodiments. Like elements labeled with similar reference numerals throughout the different embodiments of FIGS. 4-7.

As illustrated, the hub 102 defines a longitudinal axis L and may comprise (1) an upper cylindrical portion 108; (2) a middle cylindrical portion 110 proximate the upper cylindrical portion 108, the middle cylindrical portion 110 defining an upper surface 200 substantially normal to the longitudinal axis L; and (3) a hub flange 112 proximate the middle cylindrical portion 110, the hub flange 112 defining a mounting surface 202 substantially normal to the longitudinal axis L, the mounting surface 202 extending radially beyond the middle cylindrical portion 110. In one embodiment, the middle cylindrical portion 110 may extend longitudinally relative to the mounting surface 202, and the upper cylindrical portion 108 may extend longitudinally relative to the upper surface 200. Though some embodiments are shown with an upper cylindrical portion 108, a middle cylindrical portion 110, and a hub flange 112, an example embodiment need not have multiple cylindrical portions.

FIG. 3 illustrates a bottom view of an example embodiment of a motor base 118. The motor base 118 is generally cylindrical, and comprises a stator 300, which interacts with a rotor 305 comprising one or more magnets 320 and the hub 102. The stator 300 comprises a plurality of stator teeth 310, with wire wound around each stator tooth to form a plurality of wire windings or coils 315. The rotor 305 is formed from one or more magnets 320 having an annular shape. The material of the one or more magnets 320 is not particularly limited and may include a rare-earth magnet, formed of a material such as a neodymium, a ferrite magnet, or any other type of magnet as would be apparent to a person of ordinary skill in the art.

The rotor 305 may also include a back iron 325, which guides the magnetic flux in the magnetic circuit and serves as a shield to prevent magnetic flux from the one or more annular magnets 320 or the plurality of coils 315 from escaping the rotor 305 and motor base 118 and interfering with the operation of the read/write head 106. By alternately energizing different coils 315 of the stator 300 and an alternating electromagnetic field is generated that interacts with the magnet 320 of the rotor 305 to provide a torque to the hub 102. The torque applied to the hub 102 causes the hub 102 to rotate.

FIG. 4 illustrates a first example embodiment of a spindle motor comprising a hub 102 and a motor base 118. In this embodiment, the hub 102 defines a longitudinal axis L and may comprise an upper cylindrical portion 108, a middle cylindrical portion 110 proximate to the upper cylindrical portion 108 and defining an upper surface 200, and a hub flange 112 defining a mounting surface 202 substantially normal to the longitudinal axis L. Again, though this embodiment is shown with an upper cylindrical portion 108, a middle cylindrical portion 110, and a hub flange 112, an example embodiment need not have multiple cylindrical portions.

Generally, one or more disks, separated by spacers, may be mounted on the mounting surface 202 of the hub flange 112 of the hub 102. However, in FIG. 4, the one or more disks are omitted so that other components may more clearly be shown. The hub flange 112 also comprises a vertical surface 400 that extends longitudinally relative to the mounting surface 202 and substantially parallel to the longitudinal axis L. The hub flange 112 has a radius 405, which is defined as the distance between the vertical surface 400 and the longitudinal axis L.

The motor base 118 may comprise a generally cylindrical shape defining a central axis C with the back iron 325 disposed at the radially outer region of the shape of the motor base 118. The hub 102, back iron 325 and magnet 320 collectively form an example embodiment of the rotor 305 (the rotor 305 is shown in FIG. 3). Additionally, the rotor 305 may also include a shaft 430 on which the hub 102 is mounted. The shaft 430 may be a spinning shaft or a fixed, stationary shaft connected to the hub 102 by a bearing member (not shown). The motor base 118 has a radius 410, which is defined as the distance between the central axis C and the radially outer wall of the cylindrical shape of the motor base 118.

The hub 102 is coupled to the motor base 118 such that the longitudinal axis L of the hub 102 is substantially aligned with the central axis C of the motor base. Further, the radius 410 of the motor base 118 is greater than the radius 405 of the hub flange 112 by a radial difference D. By providing the motor base with a radius 410 greater than the radius 405 of the hub flange 112, improved motor efficiency may be achieved as more space may be created within the motor base for thicker wire (which may have lower resistance) or more windings may be provided on the stator or a higher torque from the magnet/stator interaction may be achieved than if the radius 410 of the motor base 118 was equal to the radius 405 of the hub flange 112.

The vertical surface 400 of the hub 102 has a height 425, which provides a vertical separation between the mounting surface 202 and the back iron 325 disposed on the motor base 118. The height 425 of the vertical surface 400 is sized to provide clearance 415 between the mounting surface 202 and the back iron 325 disposed on the motor base 118 such that a read/write head 106 can access an undersurface of the disk mounted to the mounting surface 202. In other words, the height 425 may be sufficient to provide clearance or allow access by a read/write head 106 to an undersurface of the disk in some embodiments. For example, the height 425 of the vertical surface may be 1 mm or more to allow a read/write head 106 to access the undersurface of the disk mounted to the mounting surface 202. Additionally, in order to prevent damage to the read/write head 106, a minimum separation distance 420 is maintained in some embodiments.

Figure 5:
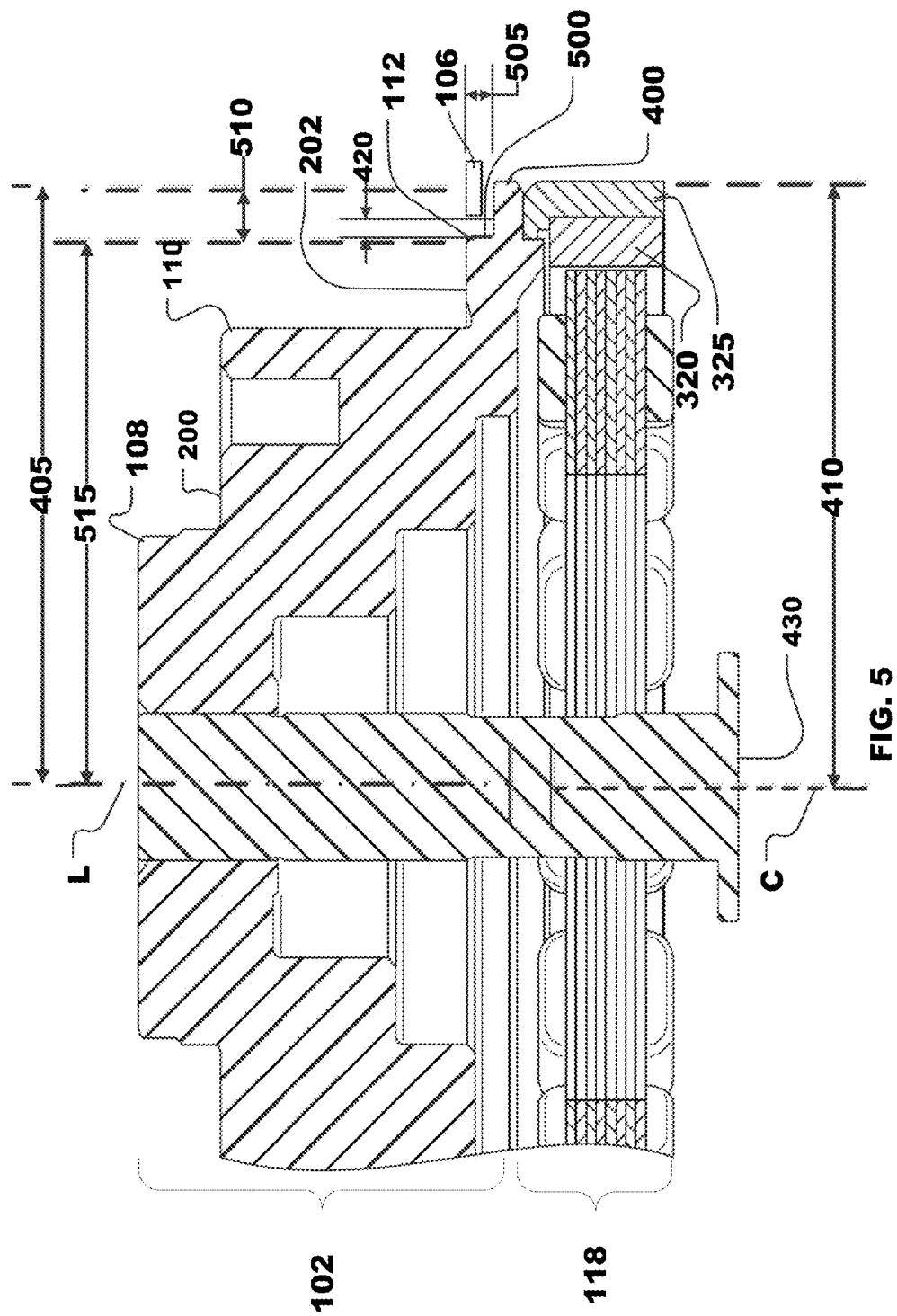
FIG. 5 is a partial section view of the hub and motor base of FIG. 1B, according to a second example embodiment.

FIG. 5 illustrates a second example embodiment of a spindle motor comprising a hub 102 and a motor base 118. In this embodiment, the hub 102 defines a longitudinal axis L and may comprise an upper cylindrical portion 108, a middle cylindrical portion 110 proximate to the upper cylindrical portion 108 and defining an upper surface 200 and a hub flange 112 defining a mounting surface 202 substantially normal to the longitudinal axis L. Again, though this embodiment is shown with an upper cylindrical portion 108, and a hub flange 112, multiple cylindrical portions are not required, and an example embodiment may have only one cylindrical portion, which defines a longitudinal axis and a disk mounting surface extending substantially normal to the longitudinal axis.

Generally, one or more disks, separated by spacers, may be mounted on the mounting surface 202 of the hub flange 112 of the hub 102. However, in FIG. 5, the one or more disks are omitted so that other components may more clearly be shown. The hub flange 112 also comprises a vertical surface 400 that extends longitudinally relative to the mounting surface 202 and substantially parallel to the longitudinal axis L. The hub flange 112 has a radius 405, which is defined as the distance between the vertical surface 400 and the longitudinal axis L.

The motor base 118 may comprise a generally cylindrical shape defining a central axis C with the back iron 325 disposed at the radially outer region of the shape of the motor base 118. The hub 102, back iron 325 and magnet 320 collectively form an example embodiment of the rotor 305 (the rotor 305 is shown in FIG. 3). Additionally, the rotor 305 may also include a shaft 430 on which the hub 102 is mounted. The shaft 430 may be a spinning shaft or a fixed, stationary shaft connected to the hub 102 by a bearing member (not shown). The motor base 118 has a radius 410, which is defined as the distance between the central axis C and the radially outer wall of the cylindrical shape of the motor base 118.

As shown in FIG. 5, the hub 102 is coupled to the motor base 118 such that the longitudinal axis L of the hub 102 is substantially aligned with the central axis C of the motor base. Further in FIG. 5, the radius 410 of the motor base 118 is substantially equal to the radius 405 of the hub flange 112. However, in some embodiments, the radius 405 of the hub flange 112 may be less than the radius 410 of the motor base 118.

As illustrated in FIG. 5, a notch 500 is formed in the vertical surface 400 of the hub 102 formed proximate to the mounting surface 202 of the hub. The notch 500 has a width 510 such that the notch 500 has a radius 515, which is defined as the distance between the longitudinal axis L and a wall of the notch 500. Thus, as shown in FIG. 5, the radius 410 of the motor base 118 is greater than the radius 515 of the notch 500.

Further, the notch 500 also has a vertical height 505, which provides a vertical separation between the mounting surface 202 and the hub 102. In an embodiment where the radius 405 of the hub 102 is less than the radius 410 of the motor base 118, the vertical height 505 of the notch 500 may provide a vertical separation between the mounting surface 202 and the back iron 325 disposed on the motor base 118. The vertical height 505 of the notch 500 is sized to provide clearance such that a read/write head 106 can access an undersurface of the disk mounted to the mounting surface 202. In other words, the vertical height 505 may be sufficient to provide clearance or allow access by a read/write head 106 to an undersurface of the disk in some embodiments. For example, the height 505 of the notch 500 may be 1 mm or more to allow a read/write head 106 to access the undersurface of the disk mounted to the mounting surface 202.

By forming the notch 500 in the vertical surface of the hub 102, the motor base 118 may be designed with a radius 410 greater than the radius 515 of the Notch 500 formed in the hub flange 112 without adversely affecting access to the under surface of the disk mounted on the mounting surface 202. By increasing the radius 410 of the motor base 118, improved motor efficiency may be achieved as more space may be created within the motor base for thicker wire (which may have lower resistance) or more windings may be provided on the stator or a higher torque from the magnet/stator interaction may be achieved.

As would be apparent to a person of ordinary skill in the art, a horizontal separation or clearance 420 between the vertical surface 400 of the hub 102 and the read/write head 106 may be maintained during operation of the disk drive to prevent damage to the read/write head.

Figure 6:
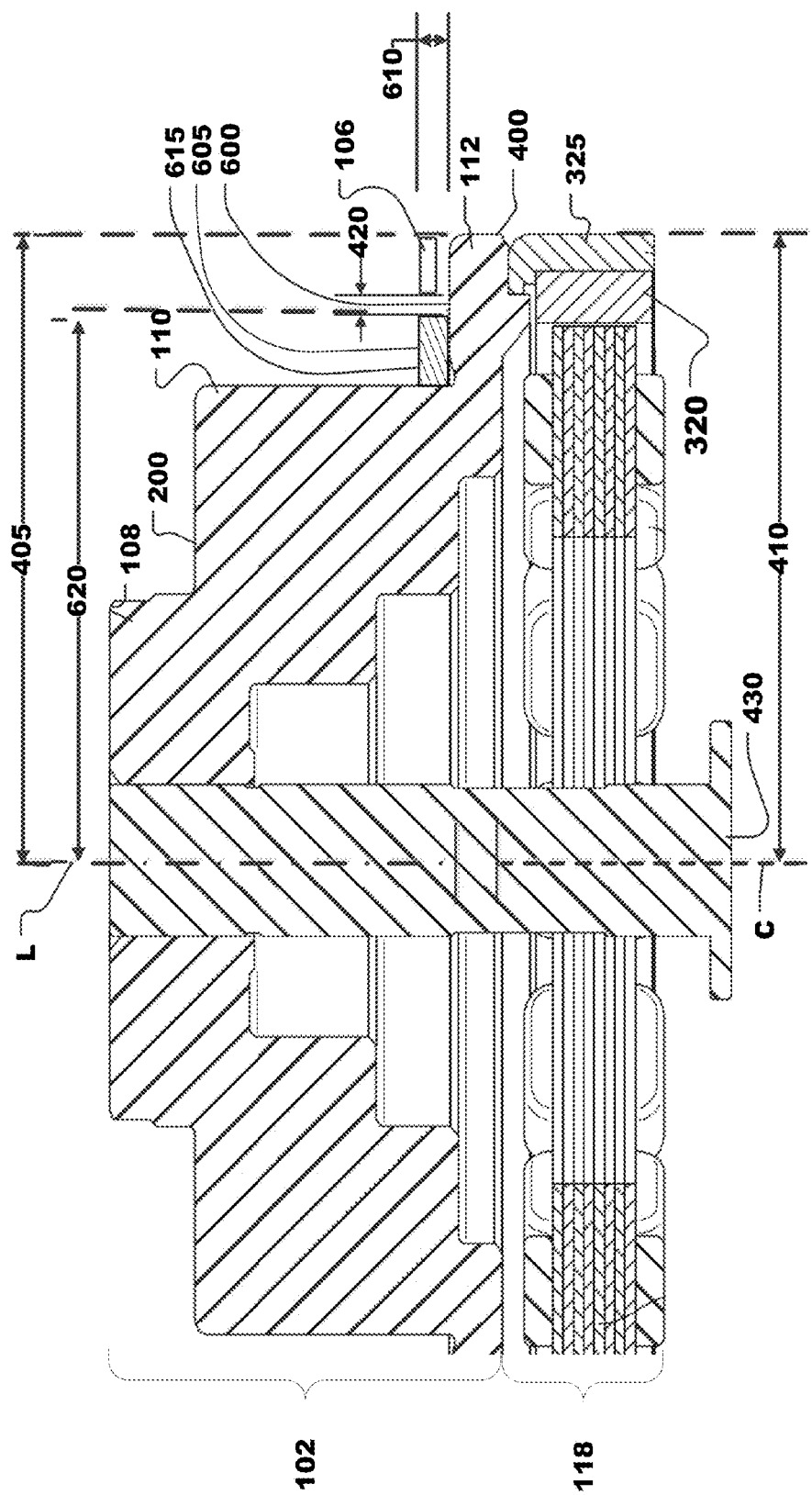
FIG. 6 is a partial section view of the hub and motor base of FIG. 1B, according to a third example embodiment.

FIG. 6 illustrates a third example embodiment of a spindle motor comprising a hub 102 and a motor base 118. In this embodiment, the hub 102 defines a longitudinal axis L and may comprise an upper cylindrical portion 108, a middle cylindrical portion 110 proximate to the upper cylindrical portion 108 and defining an upper surface 200 and a hub flange 112 defining a horizontal surface 600 substantially normal to the longitudinal axis L. Again, though this embodiment is shown with an upper cylindrical portion 108, and a hub flange 112, multiple cylindrical portions are not required, and an example embodiment may have only one cylindrical portion, which defines a longitudinal axis and a horizontal surface 600 extending substantially normal to the longitudinal axis.

The hub flange 112 also comprises a vertical surface 400 that extends longitudinally relative to the horizontal surface 600 and substantially parallel to the longitudinal axis L. The hub flange 112 has a radius 405, which is defined as the distance between the vertical surface 400 and the longitudinal axis L.

The motor base 118 may comprise a generally cylindrical shape defining a central axis C with the back iron 325 disposed at the radially outer region of the shape of the motor base 118. The hub 102, back iron 325 and magnet 320 collectively form an example embodiment of the rotor 305 (the rotor 305 is shown in FIG. 3). Additionally, the rotor 305 may also include a shaft 430 on which the hub 102 is mounted. The shaft 430 may be a spinning shaft or a fixed, stationary shaft connected to the hub 102 by a bearing member (not shown). The motor base 118 has a radius 410, which is defined as the distance between the central axis C and the radially outer wall of the cylindrical shape of the motor base 118.

In FIG. 6, the hub 102 is coupled to the motor base 118 such that the longitudinal axis L of the hub 102 is substantially aligned with the central axis C of the motor base. The radius 410 of the motor base 118 is substantially equal to the radius 405 of the hub flange 112. However, in some embodiments, the radius 405 of the hub 102 may be less than the radius 410 of the motor base 118.

In the example embodiment of FIG. 6, an annular spacer 605 is coupled to the horizontal surface 600 of the hub 102. A radius 620 of the spacer 605, which is defined as the distance between the longitudinal axis L and the radially outer wall of the annular spacer 605. Thus, as shown in FIG. 6, the radius 410 of the motor base 118 is greater than the radius 620 of the annular spacer 605.

The annular spacer 605 also has a mounting surface 615. Generally, one or more disks, separated by spacers, may be mounted on the mounting surface 615 of the annular spacer 605. However, in FIG. 6, the one or more disks are omitted so that other components may more clearly be shown.

The spacer 605 also has a vertical height 610, which provides a vertical separation between the mounting surface 615 and the hub 102. In an embodiment where the radius 405 of the hub 102 is less than the radius 410 of the motor base 118, the spacer 605 may provide a vertical separation between the mounting surface 615 and the back iron 325 disposed on the motor base 118. The vertical height 610 of the spacer 605 is sized to provide clearance such that a read/write head 106 can access an undersurface of the disk mounted to the mounting surface 202. In other words, the vertical height 610 may be sufficient to provide clearance or allow access by a read/write head 106 to an undersurface of the disk in some embodiments. For example, the height of the spacer 605 may be 1 mm or more to allow a read/write head 106 to access the undersurface of the disk mounted to the mounting surface 605.

By coupling the spacer 605 to the hub and mounting a disk on the spacer, the motor base 118 may be designed with a radius 410 greater than the radius 620 of the spacer 605 without adversely affecting access to the under surface of the disk mounted on the mounting surface 615. By increasing the radius 410 of the motor base 118, improved motor efficiency may be achieved as more space may be created within the motor base for thicker wire (which may have lower resistance) or more windings may be provided on the stator or a higher torque from the magnet/stator interaction may be achieved.

As would be apparent to a person of ordinary skill in the art, a horizontal separation or clearance 420 between the vertical surface 400 of the hub 102 and the read/write head 106 may be maintained during operation of the disk drive to prevent damage to the read/write head.

Figure 7:
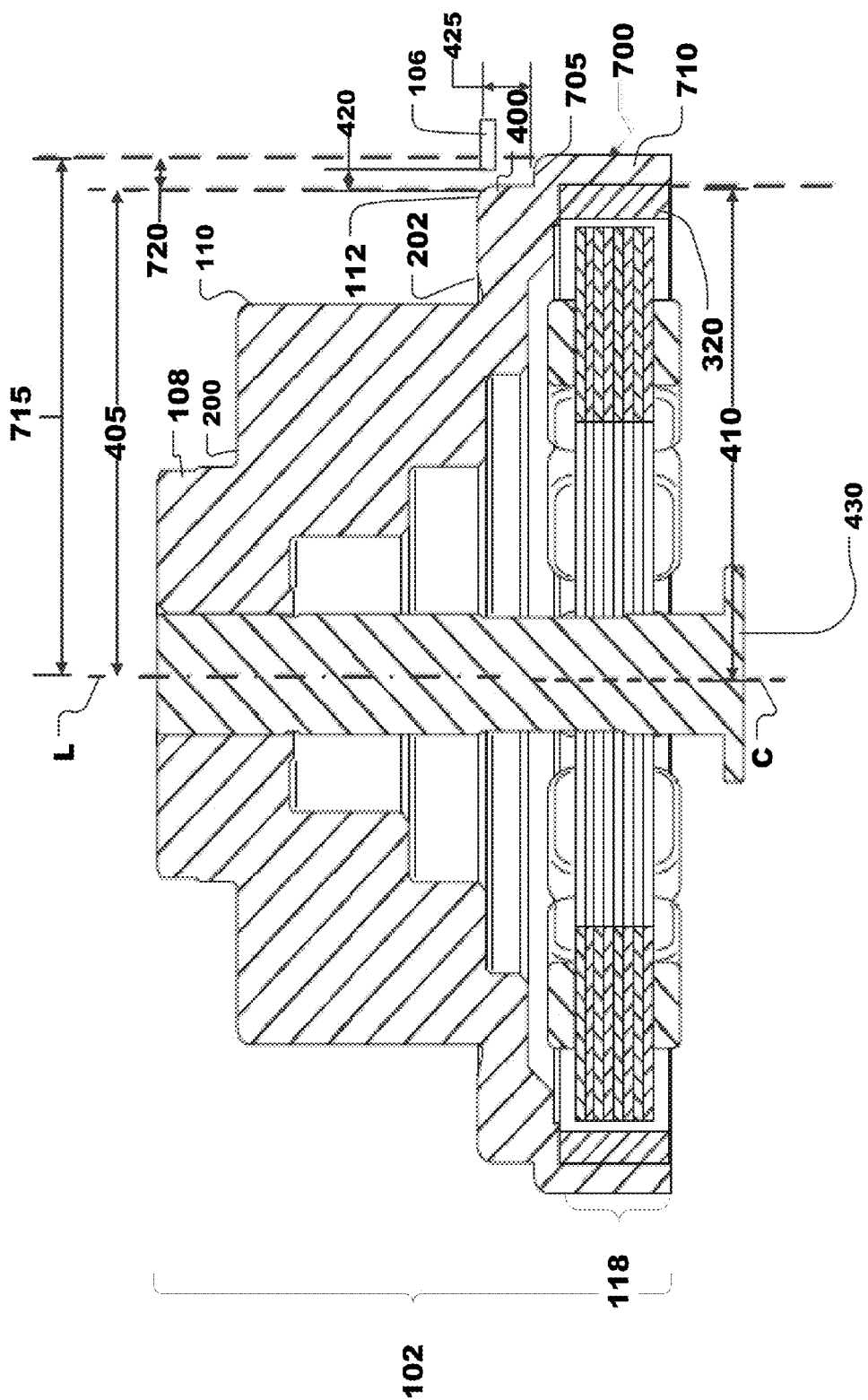
FIG. 7 is a partial section view of the hub and motor base of FIG. 1B, according to a fourth example embodiment.

FIG. 7 illustrates a fourth example embodiment of a spindle motor comprising a hub 102 and a motor base 118. In this embodiment, the hub 102 defines a longitudinal axis L and may comprise an upper cylindrical portion 108, a middle cylindrical portion 110 proximate to the upper cylindrical portion 108 and defining an upper surface 200 and a hub flange 112 defining a mounting surface 202 substantially normal to the longitudinal axis L. Again, though this embodiment is shown with an upper cylindrical portion 108, and a hub flange 112, multiple cylindrical portions are not required, and an example embodiment may have only one cylindrical portion, which defines a longitudinal axis and a mounting surface extending substantially normal to the longitudinal axis.

Generally, one or more disks separated by spacers may be mounted on the mounting surface 202 of the hub flange 112 of the hub 102. However, in FIG. 7, the one or more disks are omitted so that other components may more clearly be shown. The hub flange 112 also comprises a vertical surface 400 that extends longitudinally relative to the mounting surface 202 and substantially parallel to the longitudinal axis L. The hub flange 112 has a radius 405, which is defined as the distance between the vertical surface 400 and the longitudinal axis L.

In this example embodiment, the hub flange 112 may also comprise a shielding portion 700 which is disposed proximate to the vertical surface 400. This shielding portion 700 is formed by a horizontal shield portion 705 and a vertical shield portion 710. Additionally, the shielding portion 700 of the hub 102 also has a radius 715, which is defined as the distance between the vertical shield portion 710 and a longitudinal axis L.

The motor base 118 may comprise a generally cylindrical shape defining a central axis C with one or more annularly shaped magnets 320 disposed at the radially outer region of the shape of the motor base 118. In this embodiment, the motor base 118 does not have a back iron 325 disposed at the radially outer region thereof. Instead, in this embodiment the shielding portion 700 of the hub 102 serves as a back iron, by guiding the magnetic flux in the magnetic circuit and serving as a shield to prevent magnetic flux from the one or more annular magnets 320 or the plurality of coils 315 from escaping the rotor 305 (The hub 102, back iron 325 and magnet 320 collectively form the rotor 305 (the rotor 305 is shown in FIG. 3)) and motor base 118. The motor base 118 has a radius 410, which is defined as the distance between the central axis C and the radially outer wall of the cylindrical shape of the motor base 118.

As shown in FIG. 7, the hub 102 is coupled to the motor base 118 such that the longitudinal axis L of the hub 102 is substantially aligned with the central axis C of the motor base. Further in FIG. 7, the radius 410 of the motor base 118 is substantially equal to the radius 405 of the hub flange 112. However, in some embodiments, the radius 405 of the hub 102 may be less than the radius 410 of the motor base 118.

As illustrated in FIG. 7, a shielding portion 700 extends from the vertical surface 400 of the hub flange 112 formed proximate to the mounting surface 202 of the hub. The horizontal shield portion 705 of the shielding portion 700 has a width 720 such that the shielding portion 700 of the hub 102 has a radius 715, which is defined as the distance between the vertical shield portion 710 and a longitudinal axis L. Thus, as shown in FIG. 7, the radius 715 of the shielding portion 700 is greater than the radius 405 of the hub flange 112.

Similar to the first example embodiment discussed with respect to FIG. 4 above, the vertical surface 400 of the hub 102 has a height 425, which provides a vertical separation between the mounting surface 202 and the horizontal shield portion 705 of the shielding portion 700. The height 425 of the vertical surface 400 is sized to provide clearance 415 between the mounting surface 202 and the shielding portion 700 such that a read/write head 106 can access an undersurface of the disk mounted to the mounting surface 202. In other words, the height 425 may be sufficient to provide clearance or allow access by a read/write head 106 to an undersurface of the disk in some embodiments. For example, the height 425 of the vertical surface may be 1 mm or more to allow a read/write head 106 to access the undersurface of the disk mounted to the mounting surface 202.

As would be apparent to a person of ordinary skill in the art, a horizontal separation or clearance 420 between the vertical surface 400 of the hub 102 and the read/write head 106 may be maintained during operation of the disk drive to prevent damage to the read/write head.

Figure 8:
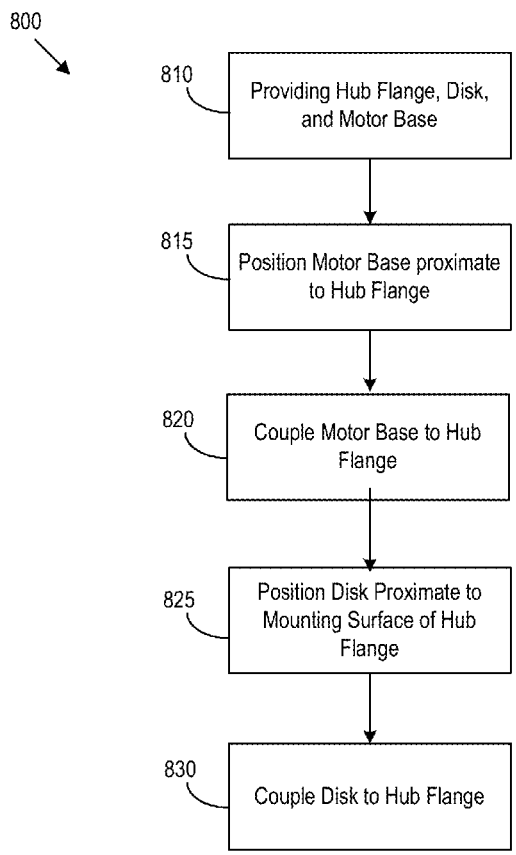
FIG. 8 illustrates a flowchart for a method of manufacturing a disk drive, according to one or more example embodiments.

FIG. 8 illustrates a flow chart for a method 800 of manufacturing a disk drive, according to one illustrated embodiment. This method 800 will be discussed in the context of the hub 102 and motor base 118 of FIGS. 1-5 and 7, and particularly in terms of the hub onto and motor base 118 illustrated in FIGS. 4, 5, and 7. However, the acts disclosed herein may be executed using a variety of different disk drive hubs, in accordance with the described method.

As described herein, at least some of the acts comprising the method 800 may be orchestrated by a processor according to an automatic disk drive manufacturing algorithm, based at least in part on computer-readable instructions stored in computer-readable memory and executable by the processor. A manual implementation of one or more acts of the method 800 may also be employed, in other embodiments.

At act 810, a hub 102, a disk 116 and a motor base 118 are provided. The hub 102 may define a mounting surface 202 and a vertical surface 400. In some embodiments, a notch 500 may be formed in the vertical surface 400 of the hub 102. Additionally, in some embodiments, the hub 102 may also include a shielding portion disposed proximate to the vertical surface 400 of the hub. The shielding portion may have a radius greater than the radius 405 of the vertical surface 400.

The motor base 118 may have a radius 410 greater than the radius 405 of the hub 102. In some embodiments, however, the motor base 118 may have a radius 410 that is equal to or less than the radius 405 of the hub 102. In some embodiments the motor base 118 may have a radius 410 greater than the radius 515 of the notch 500.

The disk 116 may define an opening there through having an inner diameter. The disk 116 may be formed in a variety of ways. In one embodiment, the media of the disk 116 may be formed, and then the first disk 116 may be stamped or otherwise machined to define the first opening.

The hub 102 may also be formed in a variety of ways. In one embodiment, the hub 102 may be machined to form the mounting surface 202 and the vertical surface 400. In other embodiments, the hub 102 may be cast, molded or machined to form the mounting surface 202 and the vertical surface 400. In still other embodiments, other manufacturing techniques may be employed.

Similarly, the manufacturing method of the motor base 118 is not particularly limited and may include machining, casting, molding, or any other methods as would be apparent to a person of ordinary skill in the art.

At act 815, the motor base 118 is positioned proximate to a lower surface of the hub 102. More specifically, a longitudinal access L of the hub 102 may be aligned with a central access C of the motor base 118. In some embodiments, a machine vision system may help align the motor base 118 and the hub 102.

At act 820, the motor base 118 is coupled to the hub 102 to form the spindle motor 120. The motor base 118 may be coupled to the hub 102 in a variety of ways. For example, a clamp may be used may be used to secure the hub 1022 motor base 118. In other embodiments, other structures for coupling these components may be used.

At act 825, the disk 116 is positioned against the mounting surface 202 of the hub 102. The disk 116 may be positioned in physical contact with the mounting surface 202. In some embodiments, a machine vision system may help align the disk 116 and the mounting surface 202 of the hub 102.

When the disk 116 is being positioned against the mounting surface 202 of the hub 102, a space is provided by the vertical surface 400 of the hub 102, the height being sufficient to provide clearance or allow access by a read/write head 106 to an undersurface of the disk 116 in some embodiments. In some embodiments, the space is provided by the notch 500 formed in the vertical surface 400 of the hub 102. In some embodiments, the space is formed between the hub 102 and the disk 116. In some embodiments, the space is formed between the disk 116 and the motor base 118. In some embodiments, the space is formed between the disk and the shielding portion (e.g. the back iron is formed as a portion of the hub) of the hub.

At act 830, the disk 116 is coupled to the hub 102 to form a part of the disk drive 100. The disk 116 may be coupled to the hub 102 in a variety of ways. In one embodiment, a disk clamp may be used to secure the disk 116 against the hub 102. In other embodiments, other structures for coupling these components may be used.

In some embodiments, multiple disks may be positioned against and coupled to the hub 102 with spacers formed there between.

Figure 9:
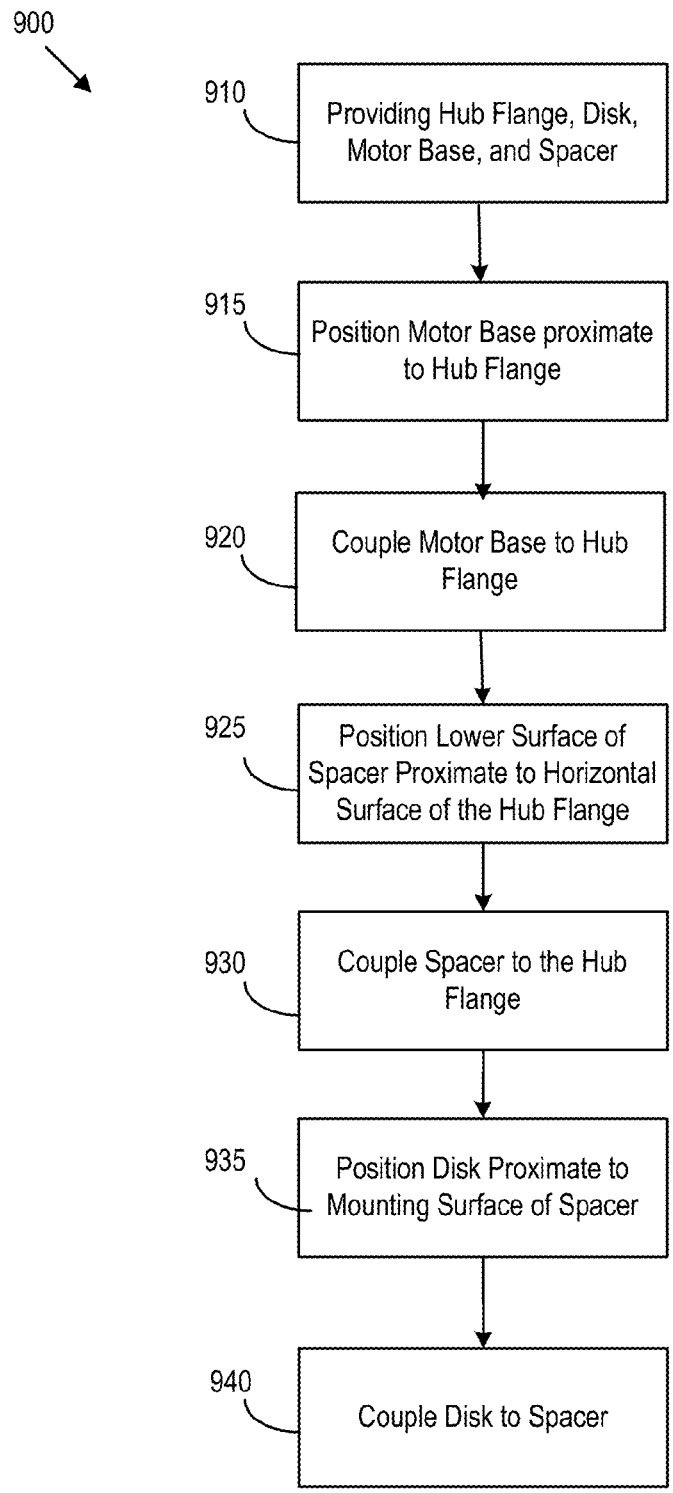
FIG. 9 illustrates a flowchart for a second method of manufacturing a disk drive, according to one or more example embodiments.

FIG. 9 illustrates a flow chart for a method 900 of manufacturing a disk drive, according to another illustrated embodiment. This method 900 will be discussed in the context of the hub 102 and motor base 118 of FIGS. 1-3 and 6, and particularly in terms of the hub onto and motor base 118 illustrated in FIG. 6. However, the acts disclosed herein may be executed using a variety of different disk drive hubs, in accordance with the described method.

As described herein, at least some of the acts comprising the method 900 may be orchestrated by a processor according to an automatic disk drive manufacturing algorithm, based at least in part on computer-readable instructions stored in computer-readable memory and executable by the processor. A manual implementation of one or more acts of the method 900 may also be employed, in other embodiments.

At act 910, a hub 102, a disk 116, a motor base 118, and a spacer 605 are provided. The hub 102 may define a horizontal surface 600 and a vertical surface 400.

The motor base 118 may have a radius 410 greater than the radius 405 of the hub 102. In some embodiments, however, the motor base 118 may have a radius 410 that is equal to or less than the radius 405 of the hub 102.

The disk 116 may define an opening there through having an inner diameter. The disk 116 may be formed in a variety of ways. In one embodiment, the media of the disk 116 may be formed, and then the first disk 116 may be stamped or otherwise machined to define the first opening.

The spacer 605 may have a generally annular shape, with a hole formed in the middle. However, embodiments of the spacer 605 are not limited to this shape. The radius 620 of the spacer 605 may be less than the radius of the motor base 118.

The hub 102 may also be formed in a variety of ways. In one embodiment, the hub 102 may be machined to form the horizontal surface 600 and the vertical surface 400. In other embodiments, the hub 102 may be cast, molded or machined to form the horizontal surface 600 and the vertical surface 400. In still other embodiments, other manufacturing techniques may be employed.

Similarly, the manufacturing method of the motor base 118 and of the spacer 605 are not particularly limited and may include machining, casting, molding, or any other methods as would be apparent to a person of ordinary skill in the art.

At act 915, the motor base 118 is positioned proximate to a lower surface of the hub 102. More specifically, a longitudinal access L of the hub 102 may be aligned with a central access C of the motor base 118. In some embodiments, a machine vision system may help align the motor base 118 and the hub 102.

At act 920, the motor base 118 is coupled to the hub 102 to form the spindle motor 120. The motor base 118 may be coupled to the hub 102 in a variety of ways. For example, a clamp may be used may be used to secure the hub 102 motor base 118. In other embodiments, other structures for coupling these components may be used.

At act 925, a lower surface of the spacer 605 is positioned against the horizontal surface 600 of the hub 102. The spacer 605 may be positioned in physical contact with the horizontal surface 600 of the hub 102. In some embodiments, a machine vision system may help align the spacer 605 and the horizontal surface 600 of the hub 102.

At act 930, the spacer 605 is coupled to the hub 102. The spacer 605 may be coupled to the hub 102 the variety ways. For example, pressure fitting or a clamping structure may be used. In other embodiments, other structures for coupling these components may be used At act 935, the disk 116 is positioned against the mounting surface 615 of the spacer 605. The disk 116 may be positioned in physical contact with the mounting surface 615. In some embodiments, a machine vision system may help align the disk 116 and the mounting surface 615 of the spacer 605.

When the disk 116 is being positioned against the mounting surface 615 of the spacer 605, a space is provided by the height 610 of the spacer 605, the height of the space being sufficient to provide clearance or allow access by a read/write head 106 to an undersurface of the disk 116 in some embodiments. In some embodiments, the space is formed between the hub 102 and the disk 116. In some embodiments, the space is formed between the disk 116 and the motor base 118.

At act 940, the disk 116 is coupled to the spacer 605 to form a part of the disk drive 100. The disk 116 may be coupled to the spacer 605 in a variety of ways. In one embodiment, a disk clamp may be used to secure the disk 116 against the spacer 605. In other embodiments, other structures for coupling these components may be used.

In some embodiments, multiple disks may be positioned against and coupled to the spacer with additional spacers formed there between.

The foregoing detailed description has set forth various embodiments of the devices and/or processes via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, the embodiments disclosed herein, in whole or in part, can be equivalently implemented in standard integrated circuits, as one or more programs executed by one or more processors, as one or more programs executed by one or more controllers (e.g., microcontrollers), as firmware, or as virtually any combination thereof.

The invention claimed is:

1. A spindle motor for a disk drive comprising:
   a rotor comprising a hub defining a longitudinal axis, said hub comprising:
   a hub flange defining a mounting surface extending substantially normal to the longitudinal axis,
   wherein the hub flange of the hub extends longitudinally relative to the mounting surface to define a vertical surface, and
   wherein the hub flange of the hub has a shielding portion comprising:
     a horizontal shield extending from the vertical surface of the hub flange of the hub in a direction substantially normal to the longitudinal axis, and
     a vertical shield extending longitudinally relative to horizontal shielding portion of the hub; and
   a motor base coupled to the hub proximate to the shielding portion of the hub,
   the motor base having a central axis substantially aligned with the longitudinal axis,
   wherein the motor base extends longitudinally,
   wherein a radius of the shielding portion of the hub is greater than a radius of the hub flange of the hub.

2. The spindle motor according to claim 1, wherein the vertical surface of the hub flange of the hub has a longitudinal height equal to or greater than 1 mm.

3. The spindle motor according to claim 1, wherein the vertical surface of the hub flange of the hub has a longitudinal height sufficient to provide clearance or to allow access by a head to an undersurface of disk mounted on the mounting surface.

4. The spindle motor according to claim 1, wherein the rotor further comprises:
   a magnet disposed proximate to and radially inward of a radial wall of the rotor; and
   wherein the shielding portion of the hub forms a metallic shield to substantially prevent magnet flux from the magnet from being transmitted out of the rotor; and
   wherein the motor base further comprises a stator comprising at least one winding of wire disposed proximate to and radially inward of the rotor.

5. A disk drive including the spindle motor according to claim 1, the disk drive further including:
   a disk supported by the mounting surface of the hub flange of the hub; and
   a head operable to write to and read from the disk,
   wherein the vertical surface of the hub flange of the hub has a longitudinal height greater than a longitudinal height of the head to provide clearance between the disk and the shielding portion of the hub or to allow the head to access an undersurface of the disk.

6. A method of manufacturing a disk drive, the method comprising:
   providing a hub defining a mounting surface and a vertical surface, a disk and a motor base having a radius greater than a radius of the hub;
   positioning the motor base proximate to the hub;
   coupling the motor base to the hub;
   positioning the disk proximate to the mounting surface of the hub such that the hub is disposed between the motor base and the disk; and
   coupling the disk to the hub.

7. The method of claim 6, wherein positioning the disk proximate to the mounting surface of the hub comprises positioning the disk such that the vertical surface of the hub forms a space between the disk and the motor base, the space having a height sufficient to provides a clearance or to allow access by a head to an undersurface of the disk coupled to the hub.

8. A method of manufacturing a disk drive, the method comprising:
   providing a rotor comprising a hub defining a mounting surface and a vertical surface, a disk and a motor base, wherein a notch having a radius less than the radius of motor base is formed in the vertical surface of the hub;
   positioning the motor base proximate to the hub;
   coupling the motor base to the hub
   positioning the disk proximate to the mounting surface of the hub such that the hub is disposed between the motor base and the disk; and
   coupling the disk to the hub.

9. The method of claim 8, wherein positioning the disk proximate to the mounting surface of the hub comprises positioning the disk such that the notch of the hub provides a space between the disk and the motor base, the space having a height sufficient to provide a clearance or to allow access by a head to an undersurface of the disk coupled to the hub.

10. A method of manufacturing a disk drive, the method comprising:
    providing a rotor comprising a hub defining a horizontal surface, a disk, a motor base, and a spacer defining a mounting surface and a lower surface on a side of the spacer opposite the mounting surface, wherein a radius formed at the spacer is less than the radius of the motor base;
    positioning the motor base proximate to the hub;
    coupling the motor base to the hub;
    positioning the lower surface of the spacer proximate to the horizontal surface of the hub, such that the hub is disposed between the motor base and the spacer;
    coupling the spacer to the hub;
    positioning the disk proximate to the mounting surface of the spacer such that the spacer is disposed between the hub and the disk; and
    coupling the disk to the spacer.

11. The method of claim 10, wherein positioning the disk proximate to the mounting surface of the spacer comprises positioning the disk such that the spacer provides a space between the disk and the motor base, the space having a height sufficient to provide a clearance or to allow access by a head to an undersurface of the disk coupled to the spacer.

12. A method of manufacturing a disk drive, the method comprising:
    providing a disk, a motor base and a rotor comprising a hub defining a mounting surface, and a vertical surface, the hub comprising a shielding portion disposed proximate to the vertical surface, the shielding portion of the hub having a radius greater than a radius of the vertical surface;

positioning the motor base proximate to the hub such that the shielding portion of the hub is disposed between the motor base and vertical surface;

coupling the motor base to the hub;

positioning the disk proximate to the mounting surface of the hub such that the vertical surface is disposed between the shielding portion of the hub and the disk; and coupling the disk to the hub.

13. The method of claim 12, wherein positioning the disk proximate to the mounting surface of the hub comprises positioning the disk such that that the vertical surface of the hub provides a space between the disk and the shielding portion, the space having a height sufficient to provide clearance or to allow access by a head to an undersurface of the disk coupled to the hub.

* * * * *